United States Patent
Peng (10) Patent No.: US 9,424,867 B2
(45) Date of Patent: Aug. 23, 2016

(54) EXCITATION OF A NEAR-FIELD TRANSDUCER USING COMBINED TRANSVERSE ELECTRIC AND TRANSVERSE MAGNETIC MODES

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/886,259

(22) Filed: Oct. 19, 2015

(65) Prior Publication Data

US 2016/0133285 A1    May 12, 2016

Related U.S. Application Data (60) Provisional application No. 62/078,071, filed on Nov. 11, 2014.

(51) Int. Cl.
| | | |
|---|---|---|
| G11B 5/02 | (2006.01) | |
| G11B 11/00 | (2006.01) | |
| G11B 5/48 | (2006.01) | |
| G11B 5/00 | (2006.01) | |

(52) U.S. Cl.
CPC ...... *G11B 5/4866* (2013.01); *G11B 2005/0021* (2013.01)

(58) Field of Classification Search
CPC .... G11B 13/08; G11B 5/3133; G11B 5/4866; G11B 5/6088; G11B 5/84; G11B 2005/0021; G11B 5/3163; G11B 5/314; G02B 6/124; G02B 6/02085; G02B 6/12007
USPC .......... 360/59; 369/112.23, 13.3, 13.33, 369/112.27, 13.29, 13.13; 385/37
See application file for complete search history.

(56) References Cited

U.S. PATENT DOCUMENTS

| | | | |
|---|---|---|---|
| 8,200,054 B1 * | 6/2012 | Li | G02B 6/124 369/13.3 |
| 2005/0018949 A1 | 1/2005 | Yan | |

* cited by examiner

*Primary Examiner* — Nabil Hindi
(74) *Attorney, Agent, or Firm* — Hollingsworth Davis, LLC (57) ABSTRACT

A method involves receiving light from a light source at a fundamental transverse electric ($TE_{00}$) mode or a fundamental transverse magnetic ($TM_{00}$) mode. A waveguide polarization multiplexes the light to a combined mode that includes the $TM_{00}$ mode and a first higher-order transverse electric ($TE_{10}$) mode. A near-field transducer is excited via the light at the combined mode.

20 Claims, 13 Drawing Sheets

EXCITATION OF A NEAR-FIELD TRANSDUCER USING COMBINED TRANSVERSE ELECTRIC AND TRANSVERSE MAGNETIC MODES

RELATED PATENT DOCUMENTS

This application claims the benefit of Provisional Patent Application Ser. No. 62/078,071 filed on Nov. 11, 2014, to which priority is claimed pursuant to 35 U.S.C. §119(e), and which is incorporated herein by reference in its entirety.

SUMMARY

The present disclosure is related to excitation of a near-field transducer using combined transverse electric and transverse magnetic modes. In one embodiment, a method involves receiving light from a light source at a fundamental transverse electric ($TE_{00}$) mode or a fundamental transverse magnetic ($TM_{00}$) mode. A waveguide polarization multiplexes the light to a combined mode that includes the $TM_{00}$ mode and a first higher-order transverse electric mode, $TE_{10}$. A near-field transducer is excited via the light at the combined mode.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a HAMR write head) having a waveguide that delivers light from an energy source (e.g., laser diode) to a near-field transducer (NFT). The NFT may also be referred to as a plasmonic transducer, plasmonic antenna, near-field antenna, nano-disk, nan-patch, nano-rod, etc. The light generates a surface plasmon field on the NFT, and the surface plasmons are directed out of a surface of the write head onto a magnetic recording medium. This creates a hotspot on the recording medium, lowering its magnetic coercivity and enabling a local magnetic field generated by a write pole to write data to the hotspot.

Two different polarizations of the light may be delivered to excite the NFT. One uses transverse electric (TE) polarization and the other one uses transverse magnetic (TM) polarization. One type of NFT uses an antenna with a peg facing towards the recording medium to generate an energy-condensed hot spot in the medium. A TE polarized waveguide mode excites localized surface plasmon mainly around the side periphery of the antenna, while TM polarized mode excites localized surface plasmons on a surface of the antenna facing or opposite to the waveguide.

The NFT efficiency in such a case is determined by the generation of localized surface plasmon at the surface of the antenna body, which funnels the charge into the peg, and the excitation of peg, lightning-rod effect. It has been observed that TE mode only or TM mode only does not match the near-field pattern of antenna. For example, a waveguide mode may have a much lower longitudinal electric field component than the dominant transverse component, which impacts the NFT efficiency.

In embodiments described below, a write head includes waveguide features that are designed to improve impedance match between a waveguide and NFT of a HAMR write head. This involves, among other things, delivering light with polarization multiplexing, for instance, both $TM_{00}$ (the fundamental transverse magnetic mode) and a $TE_{10}$ mode (the first higher-order transverse electric mode). This multiplexing can be achieved, for example, by first converting the light to a $TE_{10}$ mode via a mode converter, and then polarization multiplexing the $TE_{10}$ mode light with the $TM_{00}$ mode via a core region of the waveguide with a pinched dimension proximate the NFT. In other examples, the light is polarization multiplexed via an asymmetry of the waveguide about a substrate-parallel plane. The multiplexing results in, among other things, enhanced NFT efficiency, reduced absorption in the NFT and heads, and also improves thermal gradient for writing sharper magnetic transitions.

Figure 1:
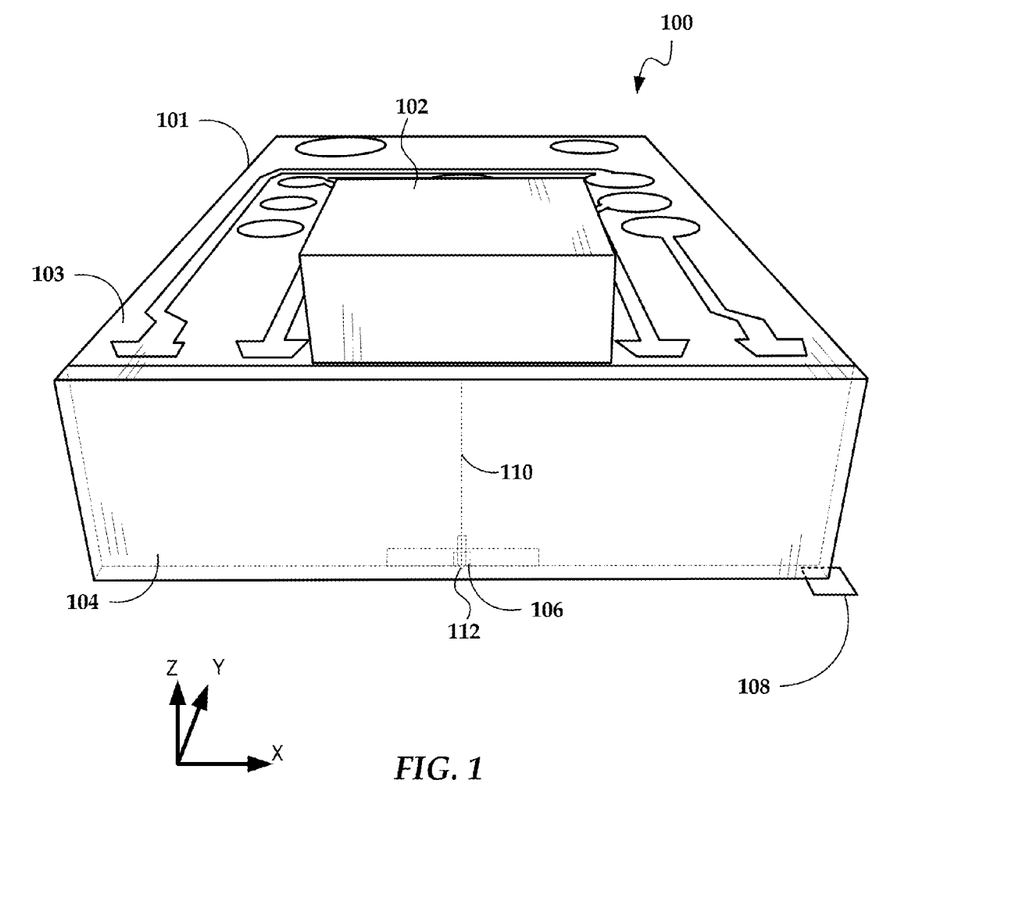
FIG. 1 is a perspective view of a slider assembly according to an example embodiment.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative z-direction in this view).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
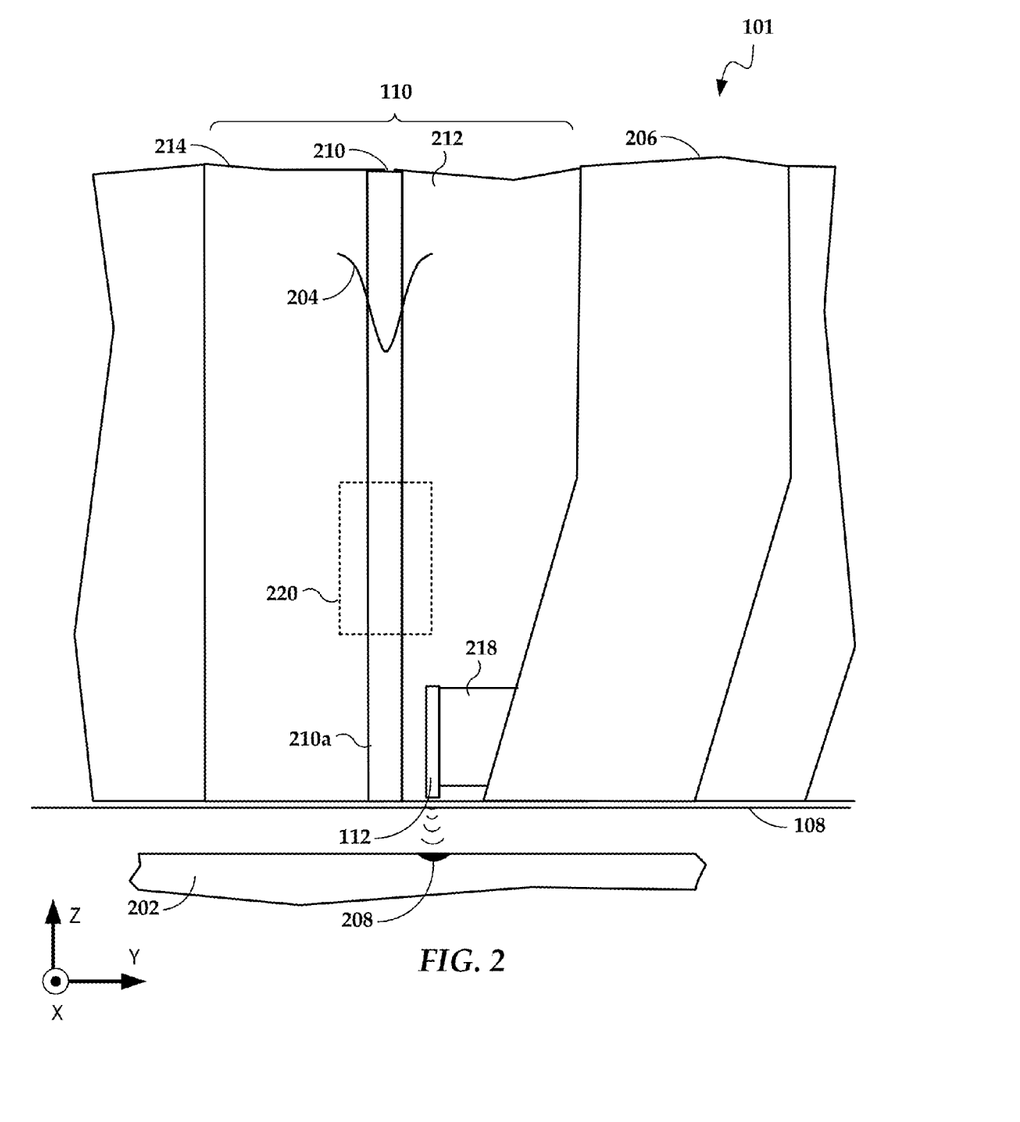
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (y-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, $Si_3N_4$, $Nb_2O_5$, AlN, $Hf_2O_3$, $Y_2O_3$, GaP, SiC, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the light propagation direction (negative z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

In this example, the energy 204 is coupled into the waveguide 110 at a fundamental transverse electric ($TE_{00}$) mode or a fundamental transverse magnetic ($TM_{00}$) mode. The waveguide 110 includes a multiplexer 220 that converts the energy 204 to a combined polarization mode. The combined mode includes a fundamental transverse $TM_{00}$ mode and a first higher-order transverse electric, $TE_{10}$. The near-field transducer 112 is excited at the combined mode, and in response, tunnels direct plasmons to the recording medium 202.

Figure 3:
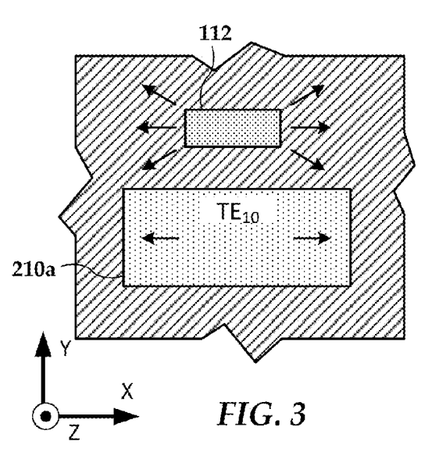
FIGS. 3 and 4 are cross-sectional views of a waveguide and near-field transducer according to example embodiments.
Figure 4:
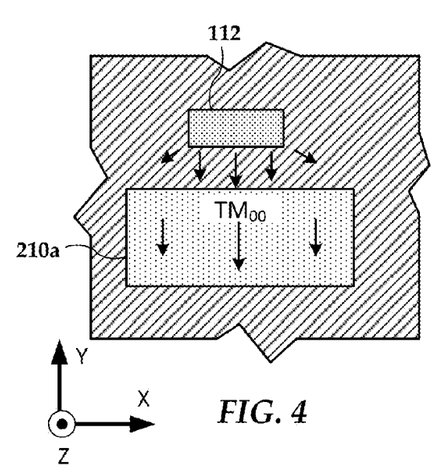

In FIGS. 3 and 4, xy-plane cross-sectional views show the near-field transducer 112 and waveguide core end 210a of FIG. 2. The arrows in FIGS. 3 and 4 represent the electric field of the respective $TE_{10}$ and $TM_{00}$ and the excitation of the NFT 112. As noted above, the $TE_{10}$ mode generally excites plasmons along an edge of the near-field transducer 112, and the $TM_{00}$ mode generally excites plasmons on a face of the NFT 112, e.g., on a substrate-parallel plane (xz-plane).

Figure 5:
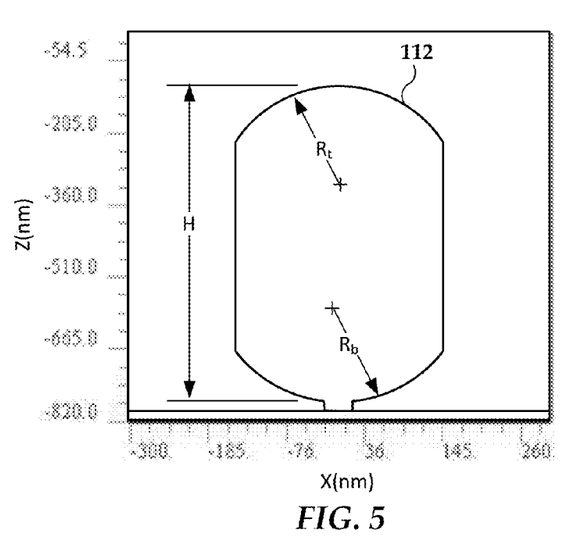
FIG. 5 is a plan view of a near-field transducer according to an example embodiment.

To demonstrate performance of various embodiments, an analysis was performed using an example of the NFT 112 designed for a $TE_{10}$ waveguide mode. Details of this NFT 112 are shown in the substrate-parallel plane (xz-plane) view of FIG. 5. The NFT 112 has two semi-circular ends with a peg attached on one end, and a middle part with straight edges. The near-field transducer interacts with the incident $TE_{10}$ waveguide mode, generating a highly localized optical spot and forming a 50-nm or smaller hot spot 208 in the magnetic recording medium 202. This incident $TE_{10}$ waveguide mode can be provided by a waveguide mode order converter that converts the input $TE_{00}$ mode into the first higher-order mode, $TE_{10}$, of a two-mode output waveguide.

With reference again to FIG. 2, the example waveguide 110 in this analysis includes by a 120 nm thick (along the y-direction) $TiO_2$ core 210 of refractive index n=2.35 and silica cladding 212, 214, n=1.46. Light wavelength λ=830 nm. The NFT 112 is 20-nm away from the core 210. Peg dimension is 40-nm wide along the x-direction (cross-track) and 30-nm thick along the y-direction (down-track). The optimal geometry for $TE_{10}$ mode excitation is: core width=400 nm (along the x-direction), NFT footprint dimension H=680 nm, $R_t=R_b=200$ nm, peg height=20 nm along the z-direction (see FIG. 5). The magnetic pole 206 is slanted and thermally coupled with the NFT 112 by a heat-sink 218.

The heat-sink 218 may have the same foot print size as the NFT, smaller than, or be recessed from the NFT. In this modeling, the same foot print size is assumed. Both the NFT 112 and heat-sink 218 use gold. The pole-NFT spacing is 20 nm at the media-facing surface 108 (ABS). The pole 206 is 200-nm wide along the x-direction and wrapped with a Cr-heat sink (not shown). The total width (along the x-direction) of the pole plus Cr heat sink is 600-nm. The heat-sink/pole is truncated at the far-end of the NFT 112.

The magnetic recording medium 202 includes a FePt layer (12.6 nm thick, complex refractive index n=2.55+j 2.72), a MgO layer (10 nm thick, n=1.70), and a heat-sink Cu layer (60 nm thick, n=0.26+j 5.29) on a glass substrate. The head-medium spacing is 8 nm, effective index n=1.21. The NFT efficiency, $CE_{50}$, is defined as the light absorption in the FePt layer in a foot print of 50 nm by 50 nm.

The output waveguide 110 supports both $TE_{10}$ and $TM_{00}$ mode. The effective mode index ($n_{eff}$) is 1.592326 for the $TE_{10}$ mode and 1.558759 for the $TM_{00}$ mode. For the $TE_{10}$ mode, the dominant electric (E) field is along x-direction, Ex, while for the $TM_{00}$ mode it is along y direction, Ey. Both modes have a longitudinal electric field, Ez, but the field amplitude is much lower than the dominant transverse component.

Figure 6:
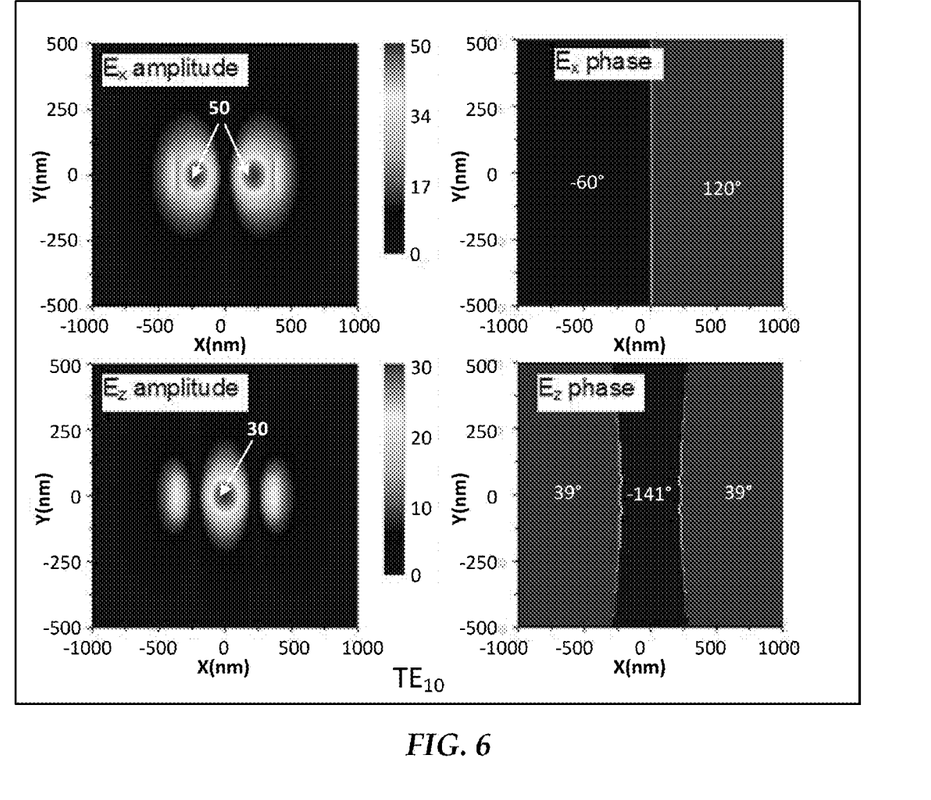
FIGS. 6, 7, and 8 are graphs showing amplitude and phase profiles of the dominant and longitudinal electric field component for both $TE_{10}$ and $TM_{00}$ modes according to example embodiments.
Figure 7:
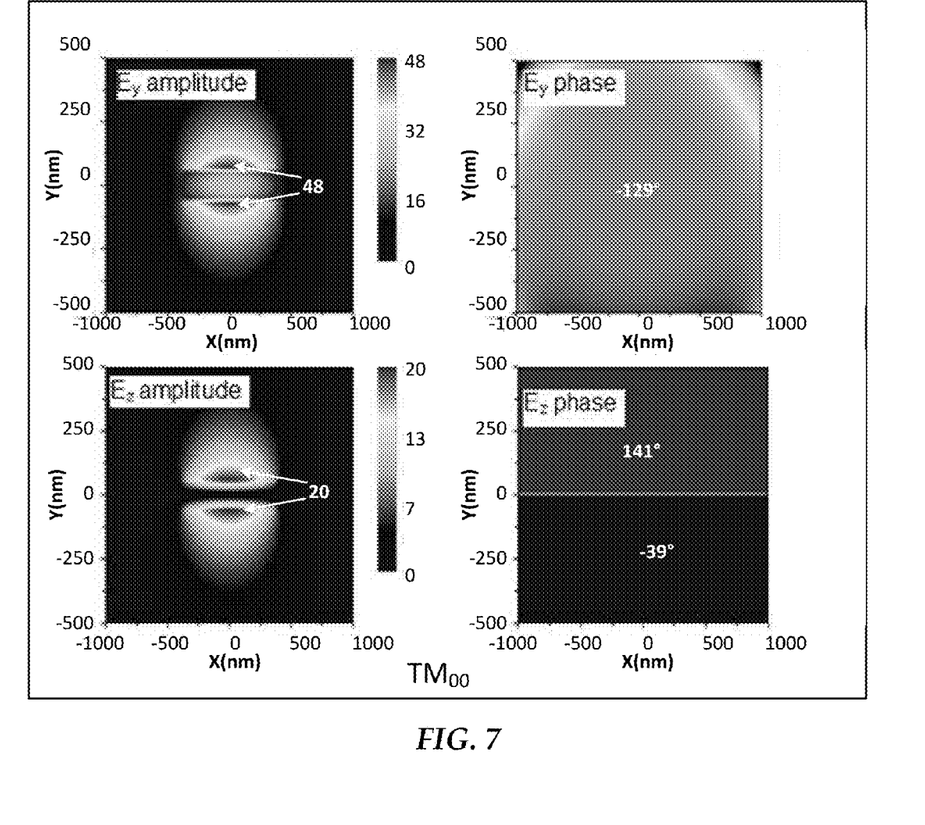

In FIGS. 6 and 7, a set of graphs shows the amplitude and phase profiles of the dominant and longitudinal electric field component for both $TE_{10}$ and $TM_{00}$ modes. The waveguide core is centered at (x, y)=(0, 0). In the presence of both $TE_{10}$ and $TM_{00}$ mode propagating in the waveguide, the total electric field, $E_t(x,y,z)$, is a superposition of the $TE_{10}$ mode, with transverse profile $\vec{E}_{TE_{00}}(x, y)$ (normalized to unit optical power in the mode), and the $TM_{00}$ mode, with transverse profile $\vec{E}_{TM_{00}}(x, y)$ (also normalized to have unit optical power in the mode) given by equations [1] and [2] below, where p denotes the relative optical power in the $TE_{10}$ mode, $n_{eff}(TE_{10})$ and $n_{eff}(TM_{00})$ stand for the effective mode index of the $TE_{10}$ and $TM_{00}$ mode, respectively, $k_0$ is the wave number in a vacuum, and $z_0$ is a reference position for the phase difference $\Delta\phi$ between the two modes.

$$\vec{E}_t(x,y,z) = \sqrt{p}\vec{E}_{TE_{10}}(x,y) + \sqrt{1-p}\vec{E}_{TM_{00}}(x,y)e^{j\Delta\phi} \quad [1]$$

$$\Delta\phi = k_0[n_{eff}(TM_{00}) - n_{eff}(TE_{10})](z-z_0) + \Delta\phi(z=z_0) \quad [2]$$

As evidenced in FIGS. 6 and 7, the Ez phase profile differs between $TE_{10}$ and $TM_{00}$ mode: symmetric along y direction at y=0 for $TE_{10}$ mode but it phase difference for $TM_{00}$ mode. The interference between $TE_{10}$ and $TM_{00}$ mode will make the Ez profile move up and down along y-direction with propagation z with a periodicity given by Equation [3] below. The transverse electric component is little impacted by this interference.

$$\frac{\lambda}{|n_{eff}(TE_{10}) - n_{eff}(TM_{00})|} \quad [3]$$

Figure 8:
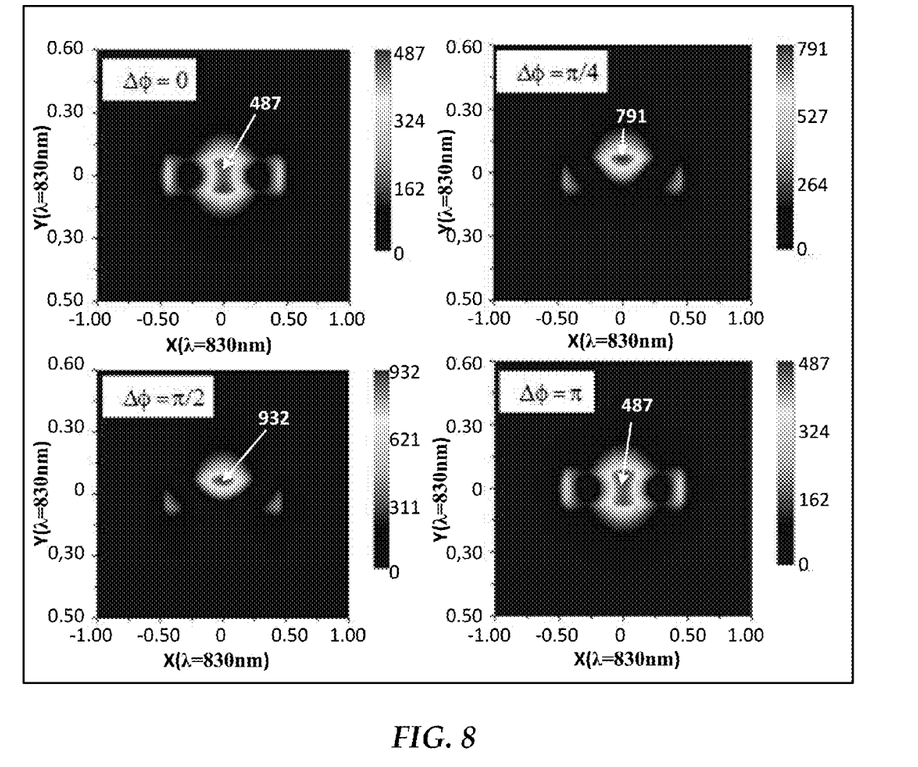

Since the NFT 112 is positioned above the waveguide core along the y-axis, see FIG. 2, constructive interference near the NFT location will yield significantly greater longitudinal electric component to excite the peg, and at the same time, reduce light absorption in the NFT body, heat-sink and magnetic pole, due to the reduction in the transverse electric field component. In FIGS. 6 and 7, the Ez phase for the $TE_{10}$ mode is $\phi_{TE10}=-0.78\pi$ and $\phi_{TM00}=0.78\pi$ for the $TM_{00}$ mode at y>0 (the NFT position), the constructive interface in Ez will occur if $\phi_{TM00} + \Delta\phi - \phi_{TE10} = 2\pi m$. Here m is an integer. If m=1, $\Delta\phi=0.43\pi$. In FIG. 8, graphs show the profile of Ez strength at $\Delta\phi=0, \pi/4, \pi/2,$ and $\pi$, assuming p=0.5. It is seen that peak Ez is near the top interface between waveguide core and cladding at $\Delta\phi=\pi/4$ and $\pi/2$, peaked at $\Delta\phi=\pi/2$. At $\Delta\phi=0$ and $\pi$, the Ez profile spreads over the waveguide core and has much lower peak amplitude.

Figure 9:
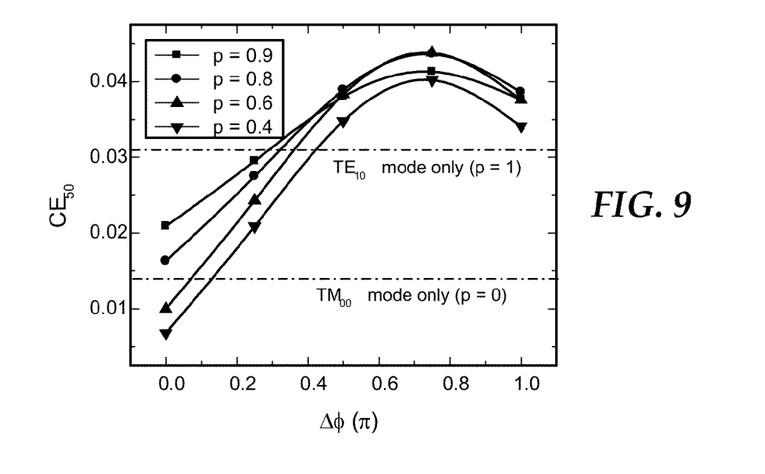
FIG. 9 is a graph showing near-field transducer efficiency versus phase difference between $TE_{10}$ and $TM_{00}$ mode for a near-field transducer according to an example embodiment at various polarization multiplexing levels.
Figure 10:
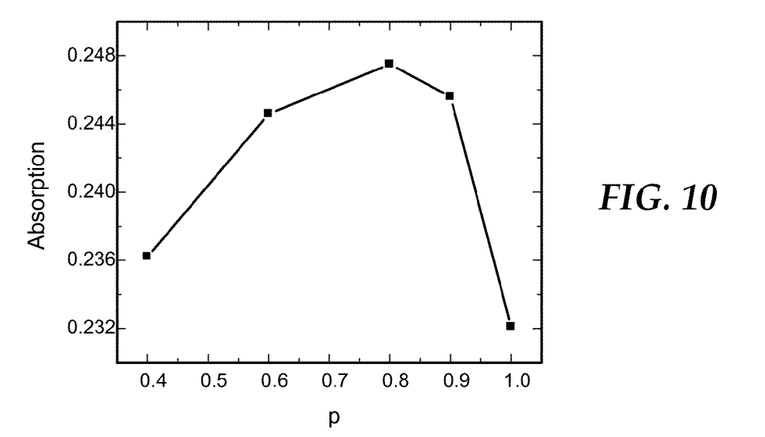
FIG. 10 is a graph showing write head absorption for various levels of polarization multiplexing in a near-field transducer according to an example embodiment.
Figure 11:
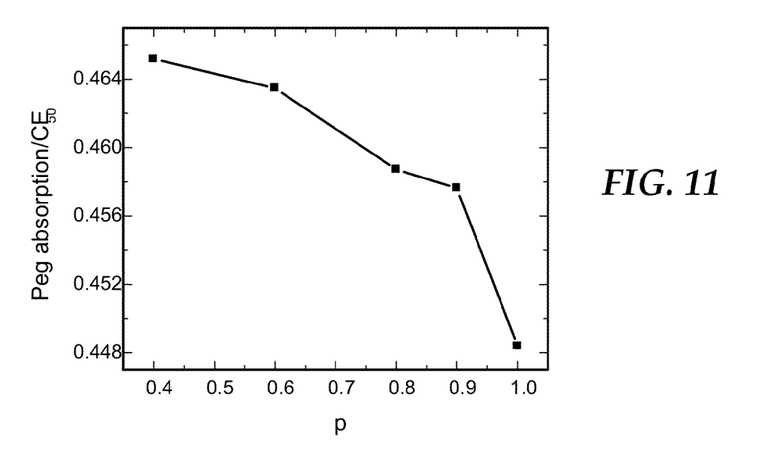
FIG. 11 is a graph showing peg absorption normalized by coupling efficiency for various levels of polarization multiplexing in a near-field transducer according to an example embodiment.
Figure 12:
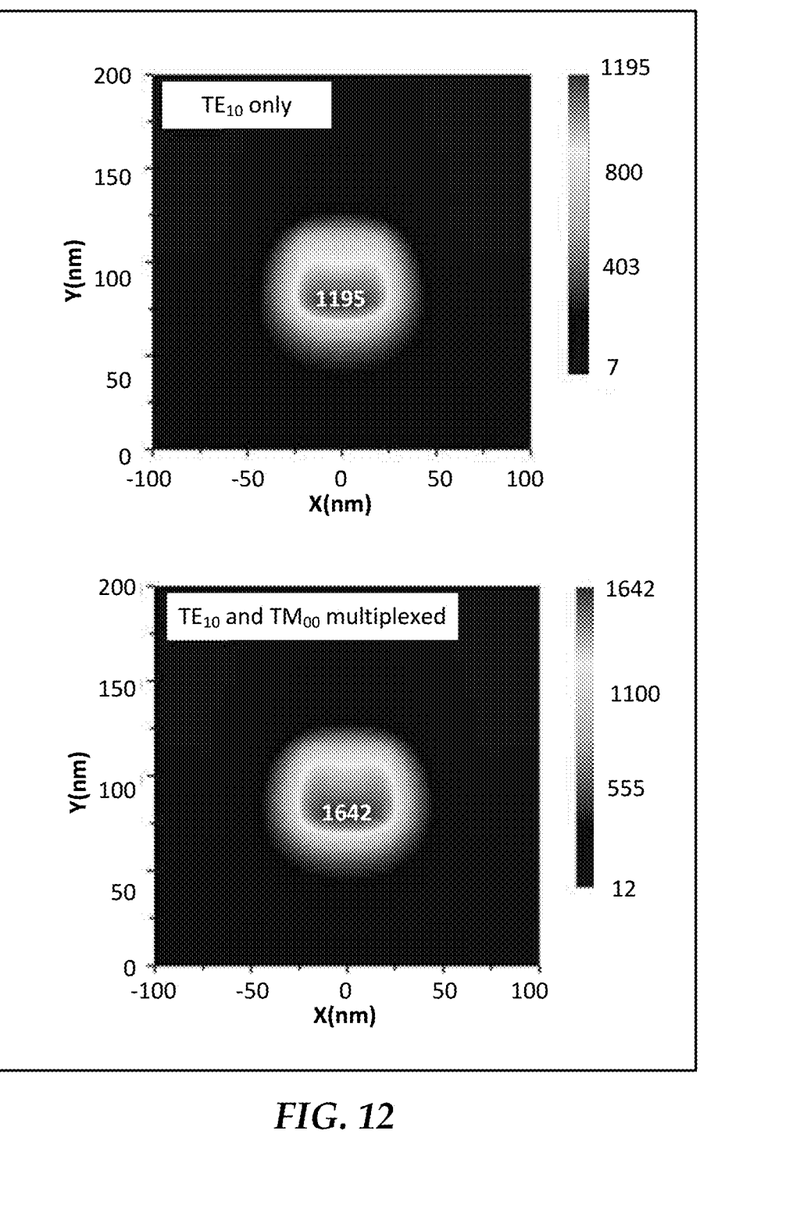
FIG. 12 includes graphs showing profiles of light absorption per unit volume at the middle plane of a recording layer according to an example embodiment.

In FIGS. 9-11, graphs show the NFT efficiency, $CE_{50}$, and total light absorption in the heads and peg as a function of $\Delta\phi$ at p=1 ($TE_{10}$ mode only), 0.9, 0.8, 0.6, 0.4, and 0 ($TM_{00}$ mode only). Interference is evident from the dependence of NFT efficiency on $\Delta\phi$ with increased the amount of $TM_{00}$ mode, 1-p. The value of $CE_{50}$ is maximized at $\Delta\phi=0.7\pi$ and at p=0.8-0.6. In FIG. 12, graphs show profiles of light absorption per unit volume (watt/μm³) at the middle plane of the recording layer for $TE_{10}$ mode only and for multiplexing $TE_{10}$ and $TM_{00}$ mode at p=0.6 and $\Delta\phi=0.75\pi$.

Comparing to the $TE_{10}$-mode-only incidence, the NFT efficiency is improved by 42% by multiplexing $TE_{10}$ and $TM_{00}$ mode. Note that this NFT dimension is optimized for the $TE_{10}$ mode incidence only. The improvement is mainly due to the increased longitudinal electric field Ez at the NFT location from the constructive interference between the $TE_{10}$ and $TM_{00}$ mode. The peak NFT efficiency is nearly at the phase difference that maximizes the longitudinal component.

Figure 13:
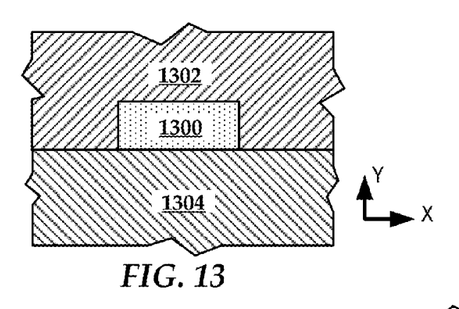
FIGS. 13, 14, and 14A are block diagrams showing example embodiments with asymmetric waveguide structures.
Figure 14:
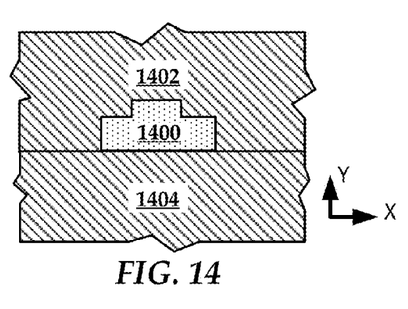

Laser diode usually emits light with a TE or TM polarization. Light is coupled into a waveguide by input waveguide coupler or grating coupler. The excited waveguide mode will be $TE_{00}$ for TE light source or $TM_{00}$ for TM light source. If the input is $TE_{00}$ mode, it could be converted into a $TE_{10}$ mode using a waveguide mode-order converter. One way to achieve $TE_{10}$ and $TM_{00}$ polarization multiplexing involves coupling between $TE_{10}$ and $TM_{00}$ mode in a waveguide of asymmetric structure along the y-direction (asymmetric about a substrate-parallel plane). The block diagrams of FIGS. 13 and 14 show example embodiments with asymmetric waveguide structure in y-direction. Another way to achieve $TE_{10}$-$TM_{00}$ mode coupling is a structured core as shown in FIG. 14A.

In FIG. 13, a waveguide core 1300 is surrounded by top cladding 1302 and bottom cladding 1304. The material for top cladding 1300 differs from that for bottom cladding, $n_t \neq n_b$. Here $n_t$ and $n_b$ denotes the respective refractive indices of the top and bottom cladding 1302, 1304. In FIG. 14, a waveguide core 1400 is surrounded by top cladding 1402 and bottom cladding 1404 of the same material, $n_t = n_b$. The shape of the core 1400 is asymmetric along the y-direction (asymmetric about the substrate-parallel plane). These asymmetries may be combined. e.g., $n_t \neq n_b$ in FIG. 14.

Figure 14A:
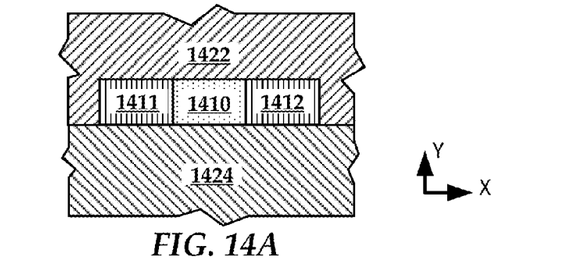

In FIG. 14A, a waveguide core includes portions 1410-1412 surrounded by cladding layers 1402, 1404. This is sometimes referred to as a structured core. The material of portion 1410 has a different index of refraction than portions 1411 and 1412. This example need not have asymmetry along the y-direction. For example, asymmetry of materials in the cladding layers 1422, 1424 is not needed to achieve the mode coupling. By adjusting the core width, the desired $TE_{10}$-$TM_{00}$ mode coupling can be achieved.

Figure 15:
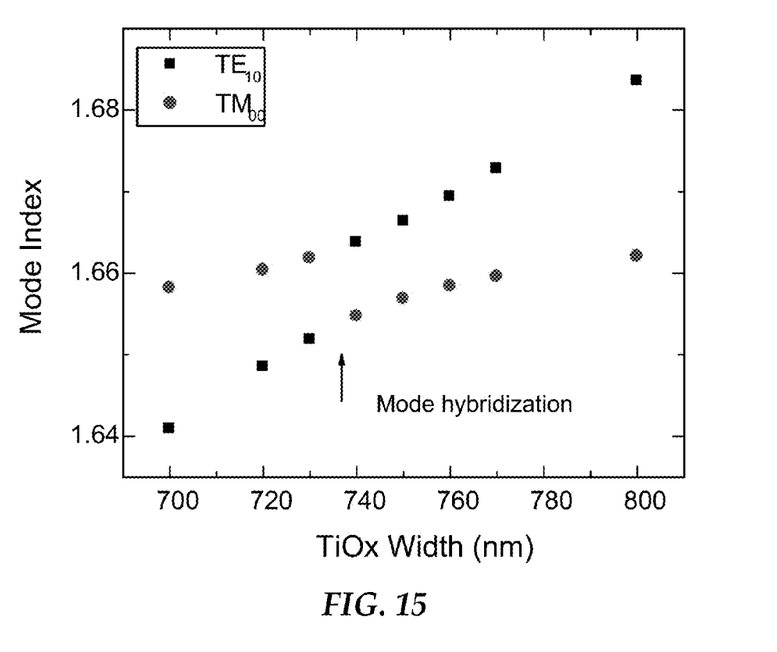
FIG. 15 is a graph showing effective mode indices for $TE_{10}$ and $TM_{00}$ mode as a function of a $TiO_2$ core width according to an example embodiment.

To demonstrate $TE_{10}$ and $TM_{00}$ mode multiplexing using an asymmetric waveguide, consider an arrangement as shown in FIG. 13, with $Al_2O_3$ top cladding 1302, $n_t=1.63$, and $SiO_2$ bottom cladding 1304, $n_b=1.46$. The waveguide core 1300 is the same as above, $TiO_2$, 120-nm thick along the y-direction. The graph in FIG. 15 shows the effective mode indices for $TE_{10}$ and $TM_{00}$ mode as a function of the $TiO_2$ core width. As core width<740 nm, the $TE_{10}$ mode has lower mode index than the $TM_{00}$ mode, while it is greater at core width≥740 nm. The $TE_{10}$ and $TM_{00}$ mode hybridization occurs at core width≈730-740 nm, where the two modes interact strongly. At this core width, the beat length for $TE_{10}$-$TM_{00}$ mode conversion is 41.5 μm, as shown below in Equation [4]. Away from this core width, the two modes interact weakly and propagate along the waveguide almost independently.

$$\frac{\lambda}{2|n_{eff}(TE_{10}) - n_{eff}(TM_{00})|} = \frac{0.83 \text{ μm}}{2 \times 0.01} = 41.5 \text{ μm} \quad [4]$$

Figure 16:
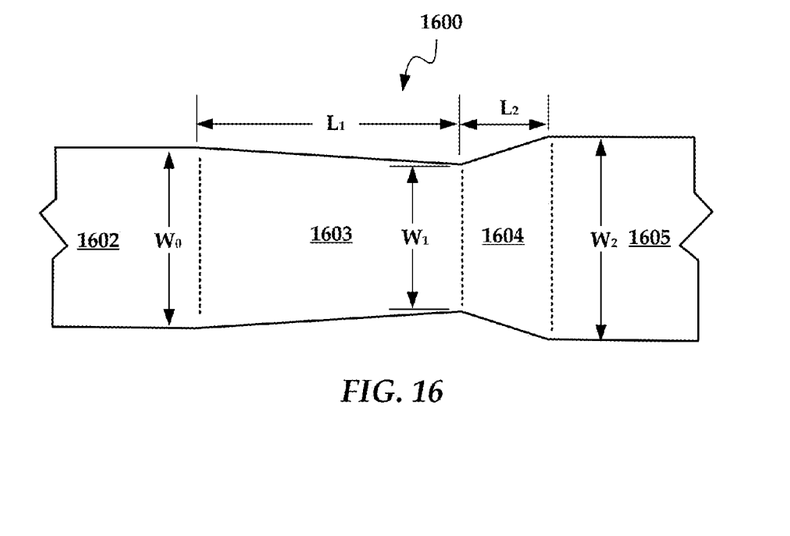
FIG. 16 is a plan view showing a waveguide used to multiplex $TE_{10}$ and $TM_{00}$ modes according to another example embodiment.

In FIG. 16, a plan view shows a core 1600 of a waveguide used to multiplex $TE_{10}$ and $TM_{00}$ modes according to another example embodiment. The core 1600 includes an input portion 1602, taper 1603, expander 1604, and output portion 1605. The mode at the input portion 1602 (e.g., $TE_{10}$ or $TM_{00}$) is partially converted to the $TM_{00}$ or $TE_{10}$ mode in the waveguide taper 1603 from $W_0$ to $W_1$ through the core width with significant hybridization between the $TE_{10}$ and $TM_{00}$ mode. In FIG. 16, $W_0 > W_1$, although in other embodiments, the opposite may be true, e.g., $W_0 < W_1$. The waveguide core width may change from $W_1$ to $W_2$ in the expander 1604 for the optimal excitation of the near-field transducer.

Figure 17:
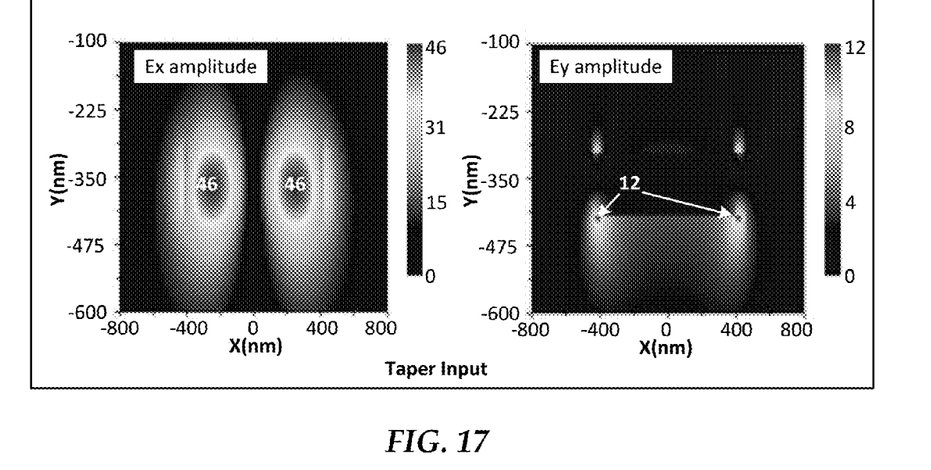
FIGS. 17, 18, and 19 are graphs showing the profiles of the transverse electric field components at various locations along a waveguide polarization multiplexer according to an example embodiment.
Figure 18:
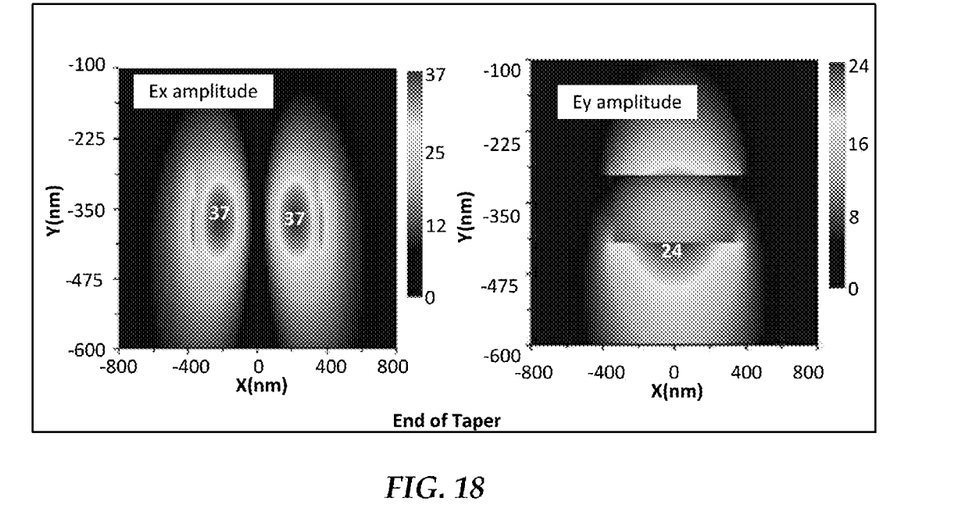
Figure 19:
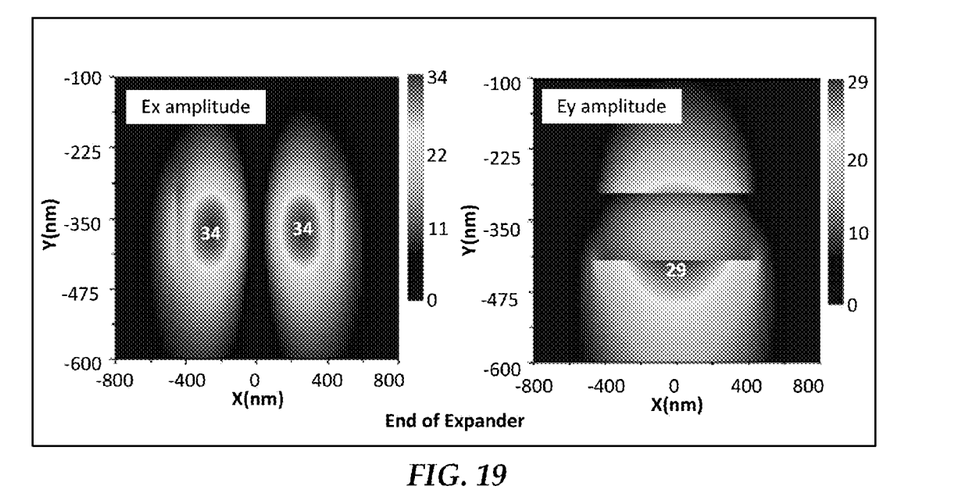

If the tapering from $W_1$ to $W_2$ through the core width results in significant hybridization between the $TE_{10}$ and $TM_{00}$ mode, the degree of tapering may be chosen to prevent the full reverse conversion back. The length of the output portion 1605 may be chosen to achieve the required the phase difference $\Delta\phi$ for NFT efficiency. In this example, $TE_{10}$ is the input mode. The waveguide geometry for polarization multiplexing is: $W_0=840$ nm, $W_1=720$ nm, $W_2=900$ nm, $L_1=30$ μm, $L_2=10$ μm. Graphs in FIGS. 17-19 show the profiles of the transverse electric field components at the input to the waveguide taper 1603, at the end of the waveguide taper 1603, and at the end of the waveguide expander 1604. At the waveguide input, the waveguide mode is $TE_{10}$ mode, the dominant electric field component is Ex. The Ey component occurs only near the four corners of the waveguide core. At the end of waveguide taper, about 29% optical power residues in the $TM_{00}$ mode; at the end of the beam expander, it increases to 45%. This increase occurs near the start of the waveguide expander, due to the strong coupling between the $TE_{10}$ and $TM_{00}$ mode near the start of the waveguide expander 1604.

Figure 20:
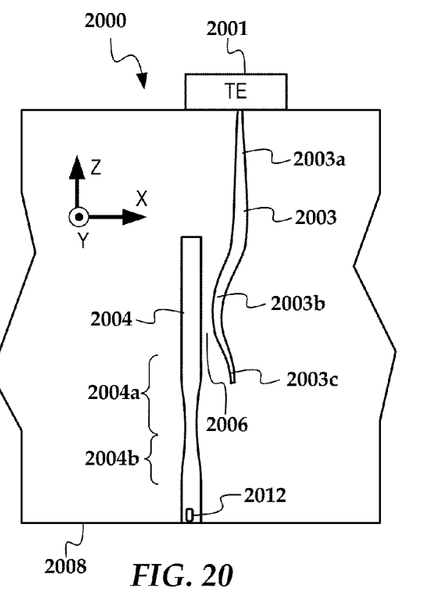
FIGS. 20, 21, and 22 are diagrams showing waveguide configurations that achieve $TE_{10}$ and $TM_{00}$ mode multiplexing according to additional embodiments.
Figure 21:
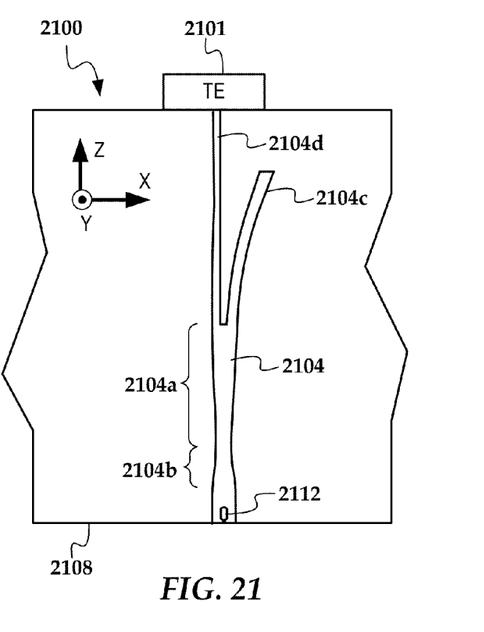
Figure 22:
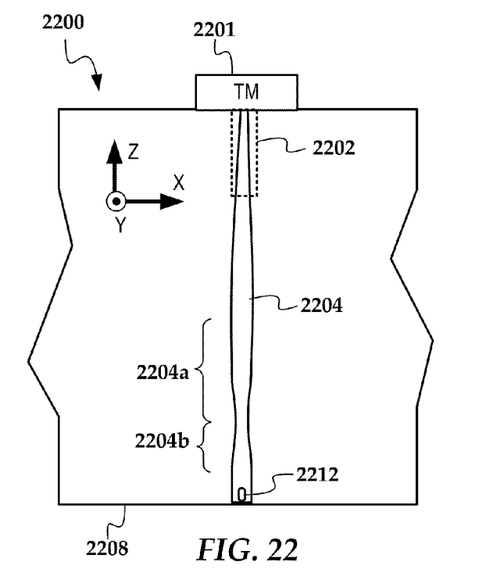

In FIGS. 20-22, diagrams show waveguide configurations that achieve $TE_{10}$ and $TM_{00}$ mode multiplexing according to additional embodiments. In FIG. 20, a slider assembly 2000 includes an energy source 2001, e.g., a laser diode that is TE polarized. An input waveguide 2003 extends along a light-propagation direction (negative z-direction) and includes, in order along the light propagation direction, an input coupler 2003a, a curved middle section 2003b, and a terminating end 2003c. Light from the energy source 2002 is coupled into the input waveguide 2003 by the waveguide input coupler 2003a.

An output waveguide 2004 extends along the light propagation direction and has an edge proximate to and separated from the curved section 2003b by a gap 2006. This arrangement acts as a mode order converter that results in $TE_{00}$ to $TE_{10}$ directional coupling in the output waveguide 2004. The output waveguide 2004 includes a partial converter 2004a (e.g., $TE_{10}$ to $TM_{00}$) and waveguide adapter 2004b. The partial converter 2004a and waveguide adapter 2004b may be configured as shown in FIGS. 13, 14, 14A and/or 16. The polarization multiplexed light is directed to a near-field transducer 2012 near a media-facing surface 2008.

In FIG. 21, a slider assembly 2100 includes an energy source 2101, e.g., a laser diode that is TE polarized. An asymmetric, branched waveguide 2104c extends towards the energy source 2101 and away from a waveguide input coupler 2104d along Z direction. The waveguide input coupler 2104d receives light from the energy source 2101. Both waveguides (2104d, 2104c) supports only single mode. The branch waveguide 2104c is usually wider than the waveguide input coupler 2104d. Only the asymmetric normal mode is excited in the system of the two waveguides, which eventually evolves the $TE_{10}$ mode when the two waveguides join. The combined waveguide 2104 includes a partial converter 2104a (e.g., $TE_{10}$ to $TM_{00}$) and waveguide adapter 2104b. The partial converter 2104a and waveguide adapter 2104b may be configured as shown in FIGS. 13, 14, 14A, and/or 16. The polarization multiplexed light is directed to a near-field transducer 2112 near a media-facing surface 2108.

In FIG. 22, a slider assembly 2200 includes an energy source 2201, e.g., a laser diode that is TM polarized. A waveguide 2204 extends along a light-propagation direction (negative z-direction) and includes a partial converter 2204a (e.g., $TM_{00}$ to $TE_{10}$) and waveguide adapter 2204b. The partial converter 2204a and waveguide adapter 2204b may be configured as shown in FIGS. 13, 14, 14A, and/or 16. The polarization multiplexed light is directed to a near-field transducer 2212 near a media-facing surface 2208. In all of the examples of FIGS. 20-22, the phase difference $\Delta\phi$ between the $TE_{10}$ and $TM_{00}$ is controlled by the waveguide length. Due to the small difference in mode index between $TE_{10}$ and $TM_{00}$ mode, the required $\Delta\phi$ can be consistently and readily obtained.

Figure 23:
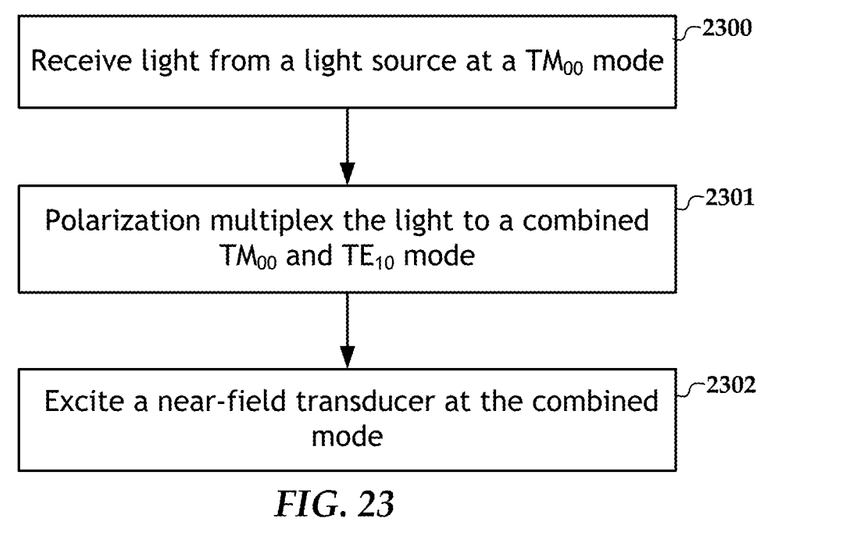
FIGS. 23 and 24 are flowcharts illustrating methods according to example embodiments.

In FIG. 23, a flowchart illustrates a method according to an example embodiment. The method involves receiving 2300 light from a light source at a fundamental transverse magnetic ($TM_{00}$) mode. The light is polarization multiplexed 2301, via a waveguide, to a combined mode that includes the $TM_{00}$ mode and a first higher-order transverse electric mode $TE_{10}$. A near-field transducer is excited 2302 via the light at the combined mode. The excited near-field transducer directs surface plasmons to a recording medium in response to the excitation.

Figure 24:
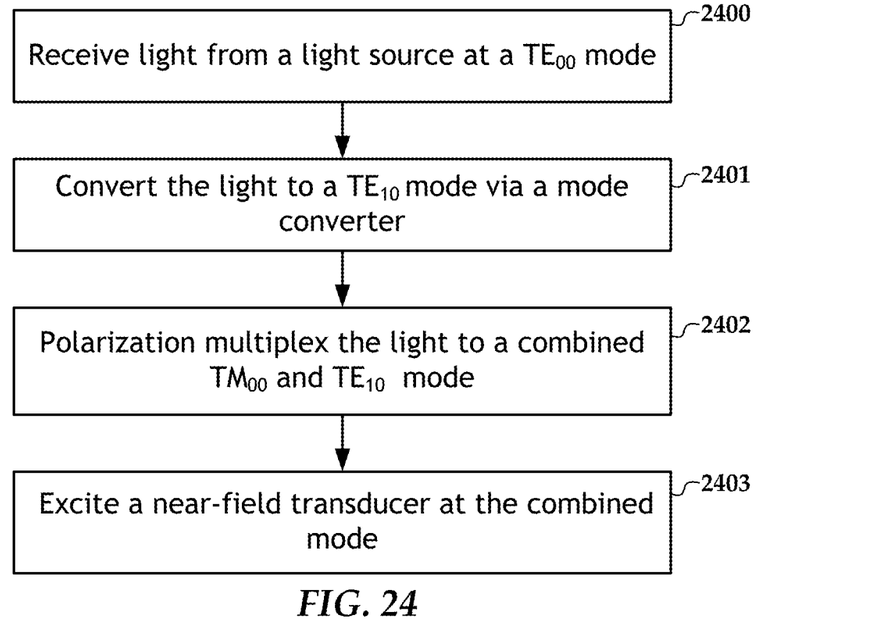

In FIG. 24, a flowchart illustrates a method according to another example embodiment. The method involves receiving 2401 light from a light source at a fundamental transverse electric ($TE_{00}$) mode. The light is converted 2401 to a first higher-order transverse electric mode $TE_{10}$ via a mode order converter, and then polarization multiplexed 2402, via a waveguide, to a combined mode that includes the $TM_{00}$ mode and the $TE_{n0}$ mode. A near-field transducer is excited 2404 via the light at the combined mode. The excited near-field transducer directs surface plasmons to a recording medium in response to the excitation.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
    receiving light from a light source at a fundamental transverse electric ($TE_{00}$) mode or a fundamental transverse magnetic ($TM_{00}$) mode;
    polarization multiplexing, via a waveguide, the light to a combined mode comprising the $TM_{00}$ mode and a first higher-order transverse electric mode $TE_{10}$; and exciting a near-field transducer via the light at the combined mode, the excited near-field transducer directing surface plasmons to a recording medium in response thereto.

2. The method of claim 1, wherein the light is polarization multiplexed via a core region with a pinched dimension proximate the near-field transducer, the core region located between the near-field transducer and the light source.

3. The method of claim 1, wherein the light is polarization multiplexed via an asymmetry of the waveguide about a substrate-parallel plane.

4. The method of claim 3, wherein the asymmetry comprises different top and bottom cladding materials surrounding a core of the waveguide.

5. The method of claim 3, wherein the waveguide comprises an asymmetric core shape about the substrate-parallel plane.

6. The method of claim 1, wherein the light is polarization multiplexed via a structured core comprising at least two materials having different index of refraction.

7. The method of claim 1, wherein the light is received at the fundamental $TE_{00}$ mode, the method further comprising first converting the light to the higher-order $TE_{10}$ mode via a mode order converter before polarization multiplexing the light to the combined mode.

8. The method of claim 7, wherein the mode order converter comprises an tapered input waveguide coupled to the light source, the tapered input waveguide proximate to and separated from an output waveguide via a gap, the output waveguide exciting the near-field transducer.

9. The method of claim 7, wherein the mode converter comprises a branch of the waveguide that extends from a middle region of the waveguide towards the light source.

10. The method of claim 1, wherein the light is received at the $TM_{00}$ mode.

11. A write head comprising:
a waveguide extending along a light-propagation direction and configured to receive light from a light source at a fundamental transverse electric ($TE_{00}$) mode or a fundamental transverse magnetic ($TM_{00}$) mode, the waveguide comprising a polarization multiplexer that converts the light to a combined mode comprising the $TM_{00}$ mode and a first higher-order transverse electric mode $TE_{10}$; and
a near-field transducer at a media-facing surface of the write head, the near-field transducer receiving the light at the combined mode from the waveguide and directing surface plasmons to a recording medium in response thereto.

12. The write head of claim 11, wherein the polarization multiplexer comprises a core region of the waveguide with a pinched cross-track dimension proximate the near-field transducer, the core region located between the near-field transducer and the light source.

13. The write head of claim 11, wherein the light is received at the $TE_{00}$ mode, the waveguide further comprising a mode order converter between the light source and the polarization multiplexer, the mode order converter converting the light to the $TE_{10}$ mode.

14. The write head of claim 13, wherein the waveguide comprises a input waveguide coupled to the light source and an output waveguide delivering the light at the combined mode to the near-field transducer, the mode converter comprising a tapered portion of the input waveguide proximate to and separated from the output waveguide via a gap.

15. The write head of claim 13, wherein the mode order converter comprises a branch of the waveguide that extends from a middle region of the waveguide towards the light source.

16. The write head of claim 11, wherein the polarization multiplexer comprises a region of asymmetry about a substrate-parallel plane.

17. The write head of claim 16, wherein the region of asymmetry comprises different top and bottom cladding materials surrounding a core of the waveguide.

18. The write head of claim 16, wherein the region of asymmetry comprises an asymmetric core shape about the substrate-parallel plane.

19. The method of claim 1, wherein the polarization multiplexer comprises a structured core having at least two materials with different index of refraction.

20. The write head of claim 11, wherein the light is received at the $TM_{00}$ mode.

* * * * *